(12) United States Patent
Liao et al.

(10) Patent No.: US 9,723,139 B2
(45) Date of Patent: Aug. 1, 2017

(54) METHOD FOR ESTABLISHING CONNECTION, METHOD FOR INSTALLING CORRESPONDING REMOTE ASSISTANCE COMMUNICATION, AND A MOBILE DEVICE USING THE SAME

(71) Applicant: HTC Corporation, Taoyuan (TW)

(72) Inventors: Shih-Chieh Liao, Taoyuan (TW); Chi-Yang Huang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 98 days.

(21) Appl. No.: 14/601,902

(22) Filed: Jan. 21, 2015

(65) Prior Publication Data

US 2016/0212260 A1  Jul. 21, 2016

(51) Int. Cl.
*H04M 3/42* (2006.01)
*H04W 4/14* (2009.01)
*H04L 29/08* (2006.01)
*H04L 29/06* (2006.01)
*H04L 12/58* (2006.01)

(52) U.S. Cl.
CPC ........ *H04M 3/42042* (2013.01); *H04L 51/18* (2013.01); *H04L 65/1096* (2013.01); *H04L 67/34* (2013.01); *H04W 4/14* (2013.01)

(58) Field of Classification Search
CPC ... H04L 67/025; H04L 65/1069; H04L 67/34; H04L 2209/80; H04L 65/1066; H04W 76/02; H04W 12/06; H04W 4/12; H04W 4/14; H04W 68/005; H04W 76/04
See application file for complete search history.

(56) References Cited

U.S. PATENT DOCUMENTS

| 2008/0139228 A1* | 6/2008 | Raffel ............... H04M 3/42195 455/466 |
| 2013/0188559 A1 | 7/2013 | Bouton |
| 2014/0066026 A1* | 3/2014 | Vogedes ............. H04M 3/4288 455/413 |
| 2014/0115033 A1 | 4/2014 | Sugaya |

\* cited by examiner

*Primary Examiner* — Kwasi Karikari
(74) *Attorney, Agent, or Firm* — Birch, Stewart, Kolasch & Birch, LLP

(57) ABSTRACT

A method for establishing connection is provided. The method includes following steps. A call is established between a first mobile device and a second mobile device. A connection-assisting item is shown on the first mobile device. When the connection-assisting item is selected, the first mobile device sends a first text message having a first format to the second mobile device. An agree-to-establish-connection item is shown on the second mobile device. When the agree-to-establish-connection item is selected, the second mobile device is connected to a server through which the first mobile device further establishes a connection with the second mobile device.

12 Claims, 10 Drawing Sheets

METHOD FOR ESTABLISHING CONNECTION, METHOD FOR INSTALLING CORRESPONDING REMOTE ASSISTANCE COMMUNICATION, AND A MOBILE DEVICE USING THE SAME

TECHNICAL FIELD

The disclosure relates in general to a method for establishing connection, a method for installing corresponding remote assistance communication software, and a mobile device using the same, and more particularly to a the method for establishing connection using text message, a method for installing corresponding remote assistance communication software using text message, and a mobile device using the same.

BACKGROUND

Mobile device, such as smart phone, has played an irreplaceable role in modern people's everyday life. The user can use a smart phone, which is virtually like a small computer, to provide many functions such as connecting to a network or Internet and making an audio call or a video call. Particularly, in recent years, there are more and more elder people starting to use smart phone to communicate with young people. However, many elder people are very unfamiliar with the operation of smart phone or even have technophobia to some extent. Therefore, how to make the design of smart phone more humanistic and more convenient for elder people to operate has long a prominent task for the industries.

SUMMARY

The disclosure is directed to a method for establishing connection, a method for installing corresponding remote assistance communication software, and a mobile device using the same. The disclosure enables a user operating a mobile phone at the local end of a call to establish connection through the call object at the other end of the call. Even though the user is not familiar with the operation of the mobile device, the user still can establish connection easily. The disclosure indeed provides tremendous convenience to the user.

According to one embodiment, a method for establishing connection is provided. The method includes following steps. A call is established between a first mobile device and a second mobile device. A connection-assisting item is shown on the first mobile device. When the connection-assisting item is selected, the first mobile device sends a first text message having a first format to the second mobile device. An agree-to-establish-connection item is shown on the second mobile device. When the agree-to-establish-connection item is selected, the second mobile device is connected to a server through which the first mobile device further establishes a connection with the second mobile device.

According to another embodiment, a method for installing remote assistance communication software is provided. The method includes following steps. A call is established between a first mobile device and a second mobile device. An installation-assisting item is shown on the first mobile device. When the installation-assisting item is selected, the first mobile device sends a text message having a specific format to the second mobile device. An agree-to-install item is shown on the second mobile device. When the agree-to-install item is selected, the second mobile device is connected to a server to obtain and install a remote assistance communication software.

According to an alternative embodiment, a mobile device is provided. The mobile device includes a processing unit, a display unit and a communication module. The display unit is coupled to the processing unit. The communication module is coupled to the processing unit. After a call is established between a mobile device and another mobile device, a connection-assisting item is shown on the display unit. When the connection-assisting item is selected, the communication module sends a first text message having a first format to another mobile device. When an agree-to-establish-connection item shown on another mobile device is selected, another mobile device is connected to a server, and a connection is established through the server and the mobile device.

The above and other aspects of the invention will become better understood with regard to the following detailed description of the preferred but non-limiting embodiment(s). The following description is made with reference to the accompanying drawings.

Figure 1:
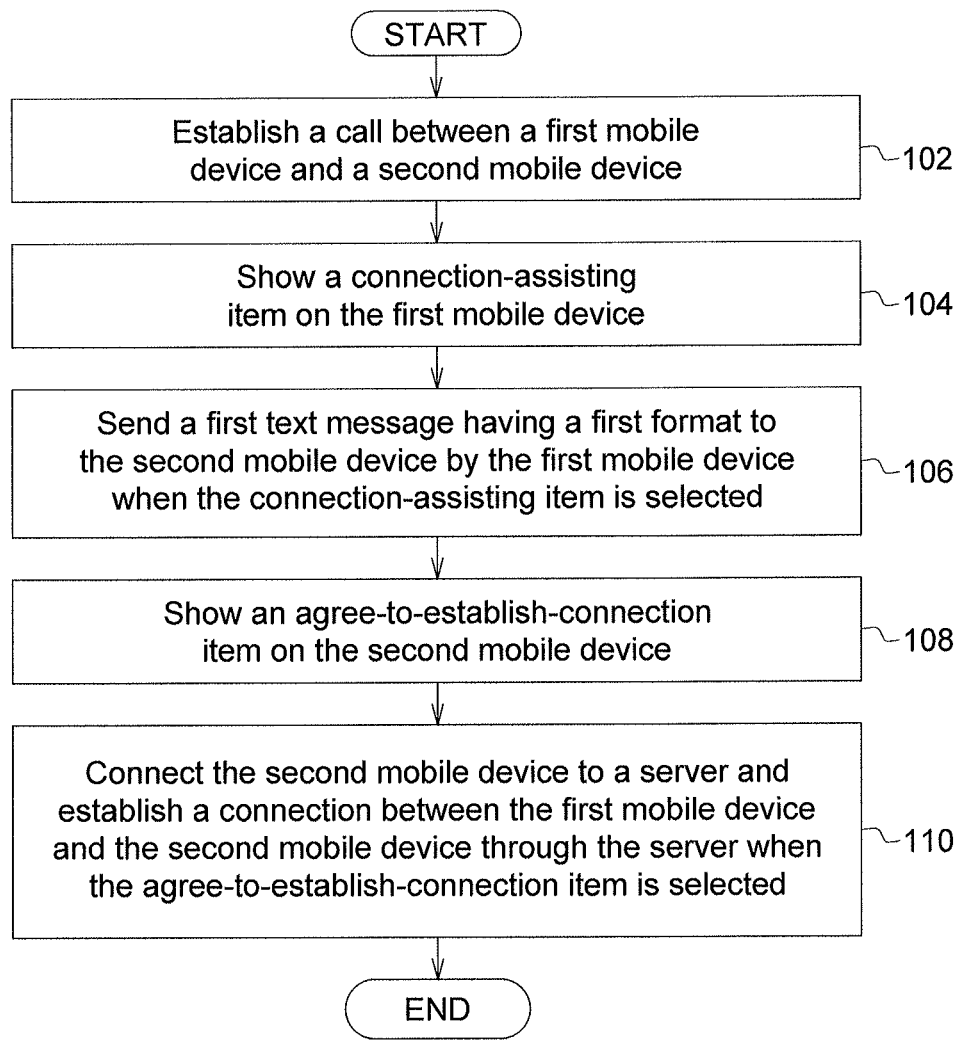
FIG. 1 is a flowchart of a method for establishing connection according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a flowchart of a method for establishing connection according to an embodiment of the disclosure is shown. The method includes following steps. Firstly, the method begins at step 102, and a call is established between a first mobile device and a second mobile device. Next, the method proceeds to step 104, a connection-assisting item is shown on the first mobile device. Then, the method proceeds to step 106, when the connection-assisting item is selected, the first mobile device sends a first text message having a first format to the second mobile device. Then, the method proceeds to step 108, an agree-to-establish-connection item is shown on the second mobile device. Following that, the method proceeds to 110, when the agree-to-establish-connection item is selected, the second mobile device is connected to a server through which the first mobile device further establishes a connection with the second mobile device.

Thus, even though the user of the second mobile device is not familiar with the operation of the mobile phone, the user of the first mobile device can send a first text message for enabling the second mobile device to be connected to the server and establish a connection with the first mobile device. For the user of the second mobile device who is not familiar with the operation of the mobile phone, such design is indeed very convenient.

Figure 2:
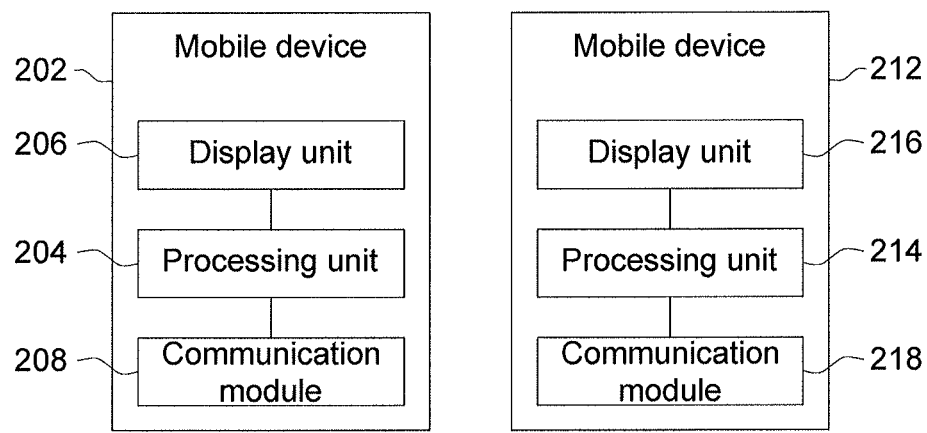
FIG. 2 is a block diagram of a mobile device for implementing the method for establishing connection.

FIG. 2 is a block diagram of a mobile device for implementing the method for establishing connection. The mobile device 202 includes a processing unit 204, a display unit 206, and a communication module 208. The display unit 206 is coupled to the processing unit 204. The communication module 208 is coupled to the processing unit 204. The mobile device 202 (such as the first mobile device) and the other mobile device 212 (such as the second mobile device) establish call. The mobile device 212 includes a processing unit 214, a display unit 216, and a communication module 218. The display unit 216 is coupled to the processing unit 214. The communication module 218 is coupled to the processing unit 214.

Figure 3A:
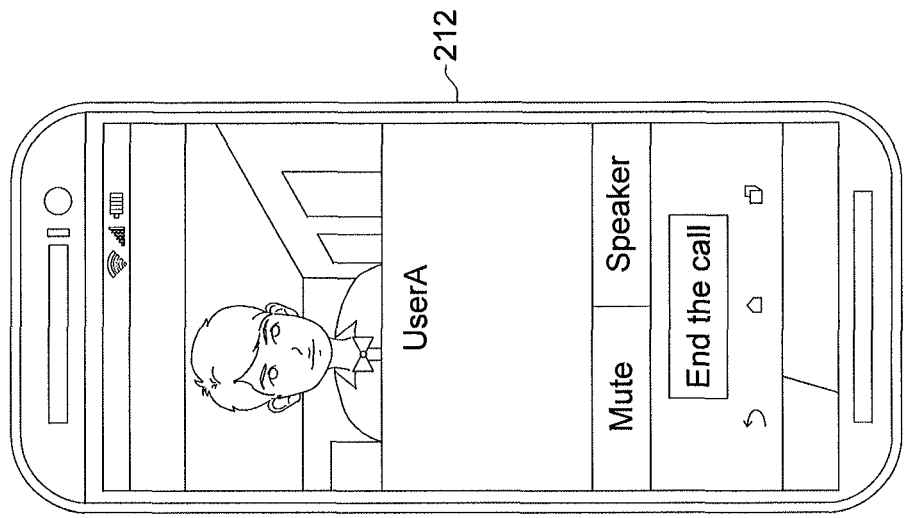
FIGS. 3A-3D are an example of display frame of two mobile devices of FIG. 2.
Figure 3A:
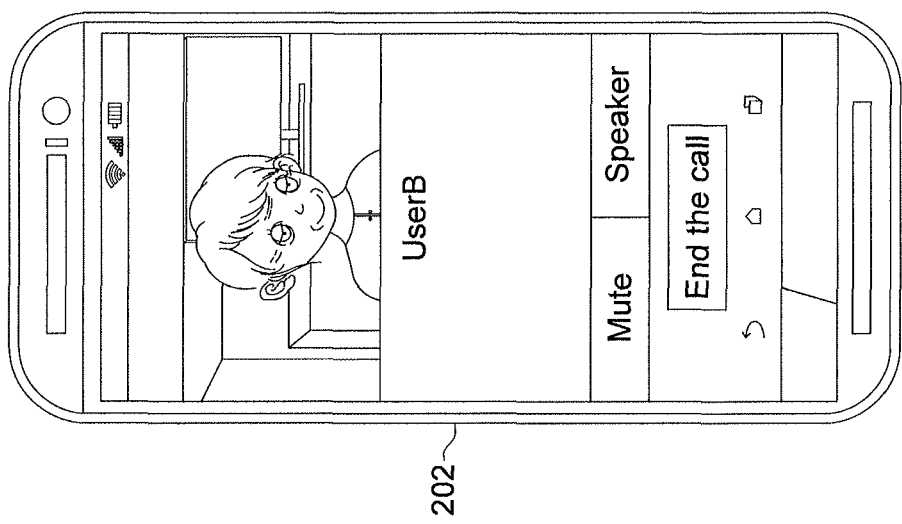

Referring to FIGS. 3A-3D, an example of display frames of mobile device 202 and mobile device 212 is shown. The mobile device 202 and the mobile device 212 establish a call as indicated in FIG. 3A. The mobile device 202 and the mobile device 212 are operated by user A and user B respectively. When the mobile device 202 and the mobile device 212 are making a call, the name of user A' session object, that is, user B's name, will be shown on the mobile device 202 operated by user A, and the name of user B's session object, that is, user A's name, will be shown on the mobile device 212 operated by user B. The mobile device 202 and the mobile device 212 establish a call through, for example, a dialer. The call exemplified in the present embodiment is a circuit switch (CS) call, which is a conventional call established through a wireless base station instead of the Internet.

Figure 3B:
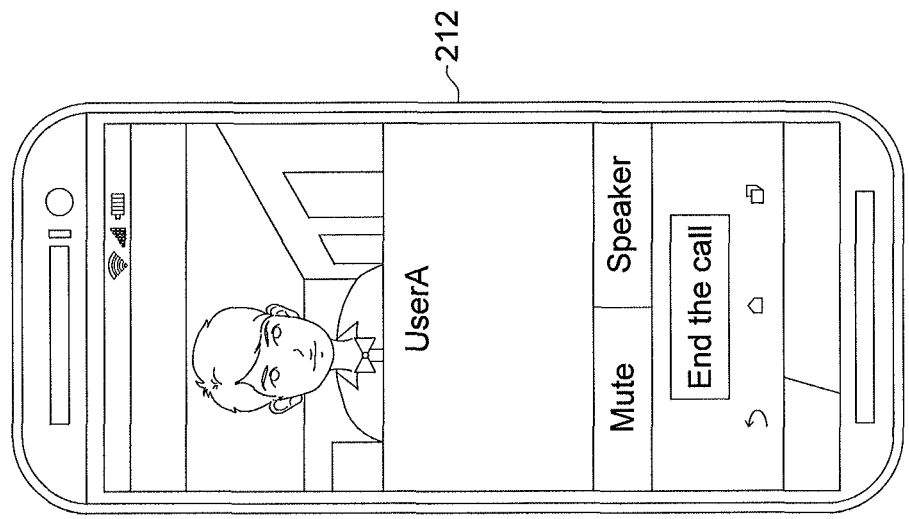
Figure 3B:
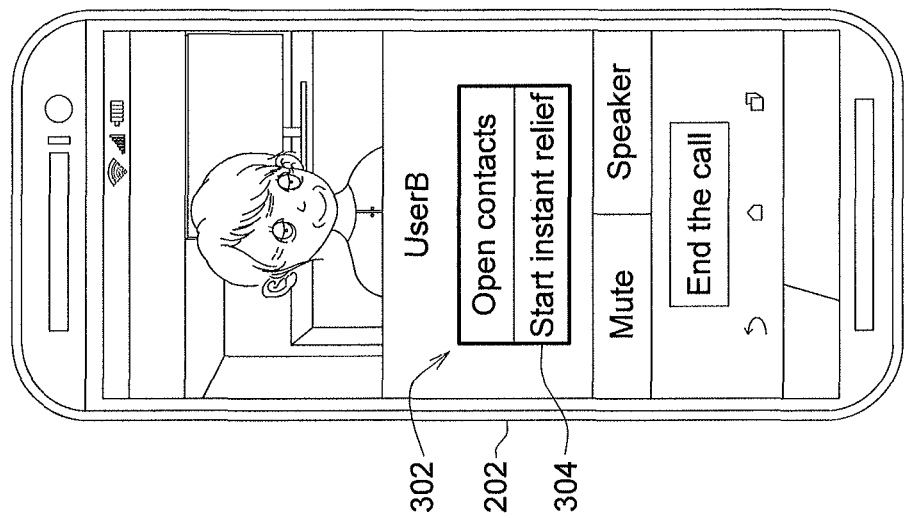

After the mobile device 202 and the mobile device 212 established a call, a connection-assisting item is shown on the display unit 206. As indicated in FIG. 3B, the connection-assisting item is a start instant relief item 304 on the menu 302, for example. That is, if user B is not familiar with the operation of making call by using a communication software through the Internet (in the present embodiment, the communication software is, for example, a remote assistance communication software), user B can seek assistance from user A through the above call. Then, user A can operate the mobile device 202 to show the abovementioned connection-assisting item (such as start instant relief item 304), and select the connection-assisting item to start the assistance for user B.

Figure 3C:
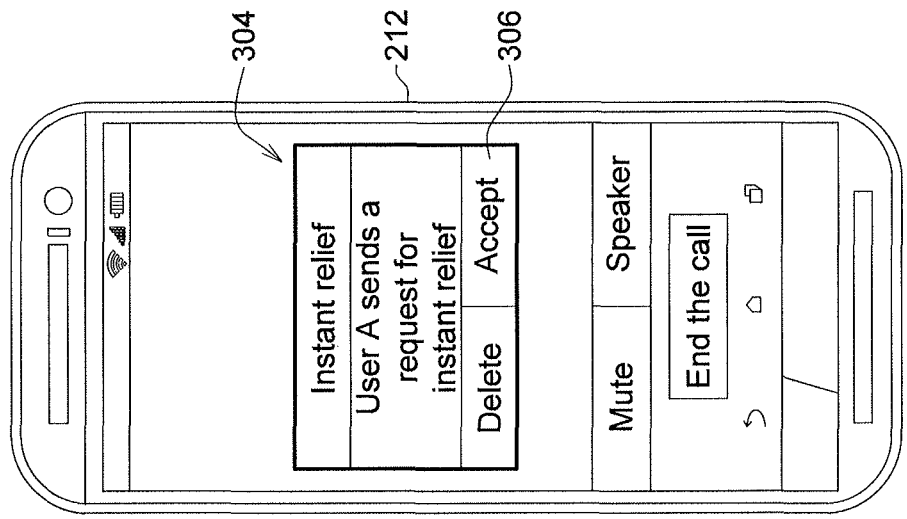
Figure 3C:
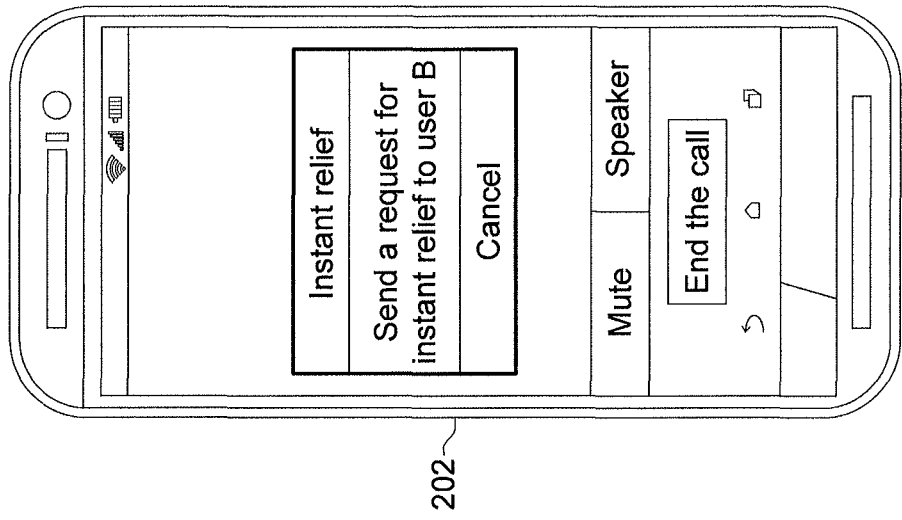
Figure 3D:
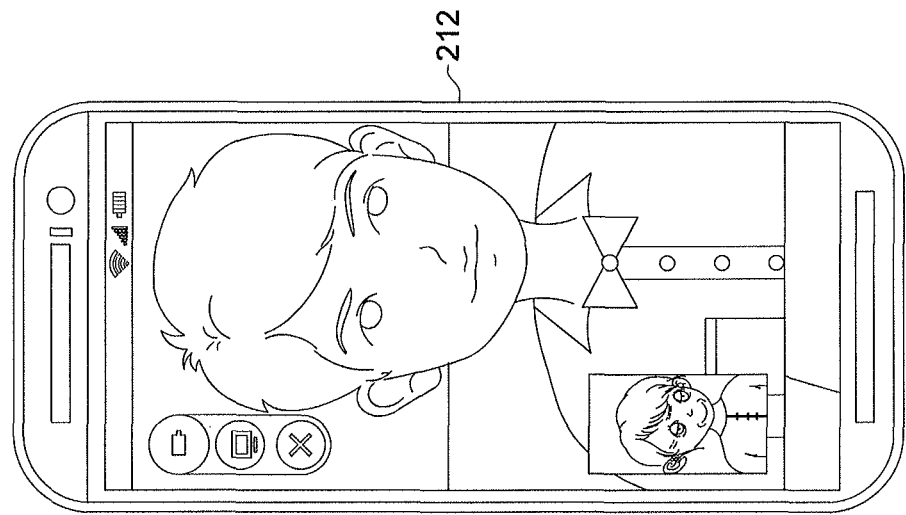
Figure 3D:
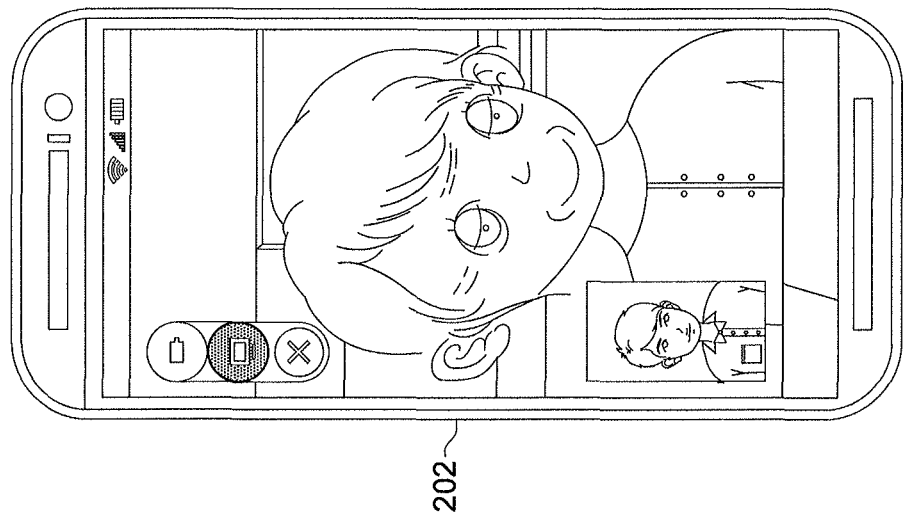

After the connection-assisting item shown on the mobile device 202 is selected by user A, the communication module 208 sends a first text message having a first format to the mobile device 212, and the agree-to-establish-connection item will be shown on the mobile device 212 accordingly. As indicated in FIG. 3C, the agree-to-establish-connection item is the accept item 306 on the menu 304, for example. When the agree-to-establish-connection item (the accept item 306) shown on mobile device 212 is selected, the mobile device 212 is connected to the server through which the mobile device 212 further establishes a connection with the mobile device 202, as indicated in FIG. 3D. The established connection is, for example, a real-time communication connection such as a video call or a network call.

The first text message contains, for example, a first account of a remote assistance communication software corresponding to the mobile device 202 and an identification mark of the remote assistance communication software. The first account is, for example, an account of user A of the mobile device 202 for the remote assistance communication software. By executing the specific remote assistance communication software, the mobile device 202 shows the connection-assisting item (such as the start instant relief item 304) of FIG. 3B during the call and sends a first text message having the first format to the mobile device 212 after the connection-assisting item is selected. If the mobile device 212 already installs the specific remote assistance communication software, the mobile device 212 will intercept the first text message having the first format. After intercepting the first text message having the first format, the mobile device 212 will show the agree-to-establish-connection item. After the agree-to-establish-connection item is selected, the mobile device 212 executes the remote assistance communication software, and a second account for the remote assistance communication software corresponding to the second mobile device (that is, the account of user B for the remote assistance communication software) and the first account for the remote assistance communication software corresponding to the mobile device 202 are used for establishing connection.

That is, through the remote assistance communication software, the mobile device 212 enables user B to log in the remote assistance communication software by using the second account. Since the mobile device 202 has logged in the remote assistance communication software by using the first account, the mobile device 202 and the mobile device 212 can be connected to each other through the remote assistance communication software. The above connection established through the Internet is different from the conventional call. The above connection can be realized by internet. The connection is, for example, a real-time communication connection (such as a video call or a network call).

In another example, after the agree-to-establish-connection item is selected, if the mobile device 212 has not yet been connected to the network, the mobile device 212 will execute the remote assistance communication software and automatically connect to the network. Moreover, the mobile device 212 establishes connection with the first account by using the second account.

Even though user B is not familiar with the operation of the remote assistance communication software, does not understand how to start or log in the remote assistance communication software, or does not know how to connect to the Internet, the embodiment of the disclosure still can help user B to connect to user A. The session object (user A) at the other end of a call can select the connection-assisting item, which enables the remote assistance communication software to send a first text message to activate the remote assistance communication software of the mobile device operated by user B. After both user A and user B logged in their account, the two mobile devices will be automatically connected to each other. User B is, for example, an elder person not familiar with the operation of mobile phone. Through the above procedure, user B can also log in the remote assistance communication software to connect or make a call to user A. Such design is indeed very convenient and at the same time relieves user B of the trouble and fear arising from operating the mobile phone.

In another embodiment, if the mobile device operated by user B has not yet downloaded and installed the remote assistance communication software, user A can help user B to download and install the remote assistance communication software. After step 104 in which the connection-assisting item is shown on the first mobile device but before step 106 in which the first text message is sent by the first mobile device, the method can further includes following step. Firstly, the first mobile device queries the state of the second mobile device. If the second account for the remote assistance communication software corresponding to the second mobile device is in an unregistered state, the installation-assisting item is shown on the first mobile device. Then, when the installation-assisting item is selected, the first mobile device sends a second text message having a second format to the second mobile device. Then, an agree-to-install item is shown on the second mobile device. Afterwards, when the agree-to-install item is selected, the second mobile device is connected to a server through which the remote assistance communication software is obtained and installed in the second mobile device.

The content of the second text message contains, for example, an identification information of the remote assistance communication software, and an installation download link path of the remote assistance communication software on the network. By intercepting the second text message, the second mobile device can determine whether the text message is related to the remote assistance communication software. The function of determining the content of the text message and intercepting the second text message having the second format can be configured in the software or hardware of the mobile phone by the manufacturer. If the text message is related to the remote assistance communication software, the second mobile device will be linked to the installation download link path, which is recorded in the second text message, of the remote assistance communication software. Then, the remote assistance communication software will be downloaded to the second mobile device and be installed in the second mobile device. The above installation-assisting item, for example, is the item for user A to confirm whether user A would like to assist user B with downloading and installing the remote assistance communication software. The agree-to-install item, for example, is the item for user B to confirm whether user B agrees to be assisted by user A for downloading and installing the remote assistance communication software, and allows the remote assistance communication software to be automatically installed in the mobile device operated by user B.

Figure 4:
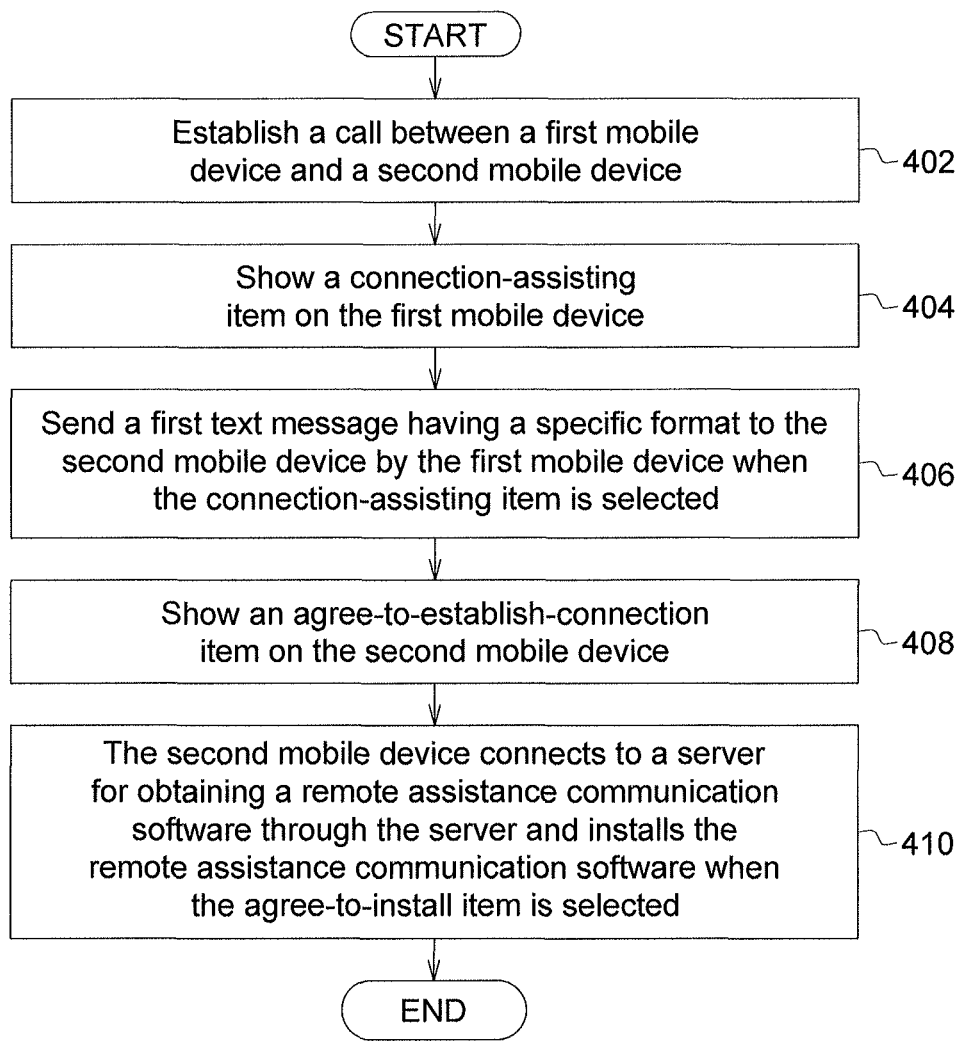
FIG. 4 is a flowchart of a method for installing remote assistance communication software according to an embodiment of the disclosure.

In another embodiment of the disclosure, a method for installing remote assistance communication software is provided, and the flowchart of the method is illustrated in FIG. 4. The method includes following steps. Firstly, the method begins at step 402, a call is established between the first mobile device and the second mobile device. Next, the method proceeds to step 404, an installation-assisting item is shown on the first mobile device. Then, the method proceeds to step 406, when the installation-assisting item is selected, the first mobile device sends a text message having a specific format to the second mobile device. Then, the method proceeds to step 408, an agree-to-install item is shown on the second mobile device. Then, the method proceeds to step 410, when the agree-to-install item is selected, the second mobile device is connected to a server through which the remote assistance communication software is obtained and installed in the second mobile device.

Under the circumstance that the second mobile device has not yet downloaded and installed the remote assistance communication software and the user of the second mobile device may not know how to install the remote assistance communication software, the user of the first mobile device at the other end of the call can assist the user of the second mobile device with installing the remote assistance communication software. Similarly, the above installation-assisting item, for example, is the item for user A to confirm whether user A would like to assist user B with downloading and installing the remote assistance communication software, and the agree-to-install item, for example, is the item for user B to confirm whether user B agrees to be assisted by user A for downloading and installing the remote assistance communication software and allows the remote assistance communication software to be automatically installed in the mobile device operated by user B. The content of the above text message having specific format includes an identification information of the remote assistance communication software and an installation download link path of the remote assistance communication software on the network.

Figure 5A:
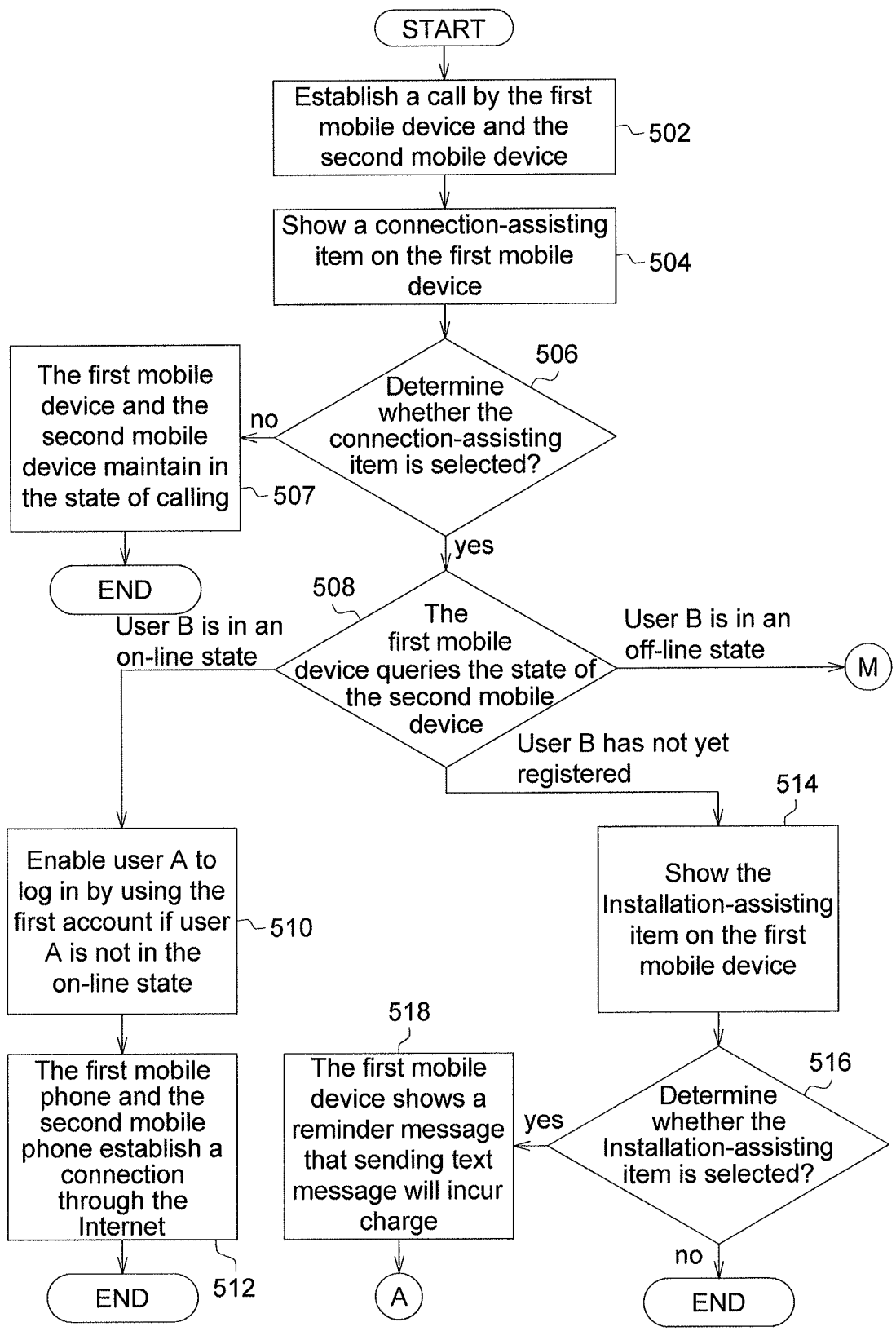
FIGS. 5A-5C is a flowchart of an example of detailed steps of the embodiment of the disclosure.
Figure 5B:
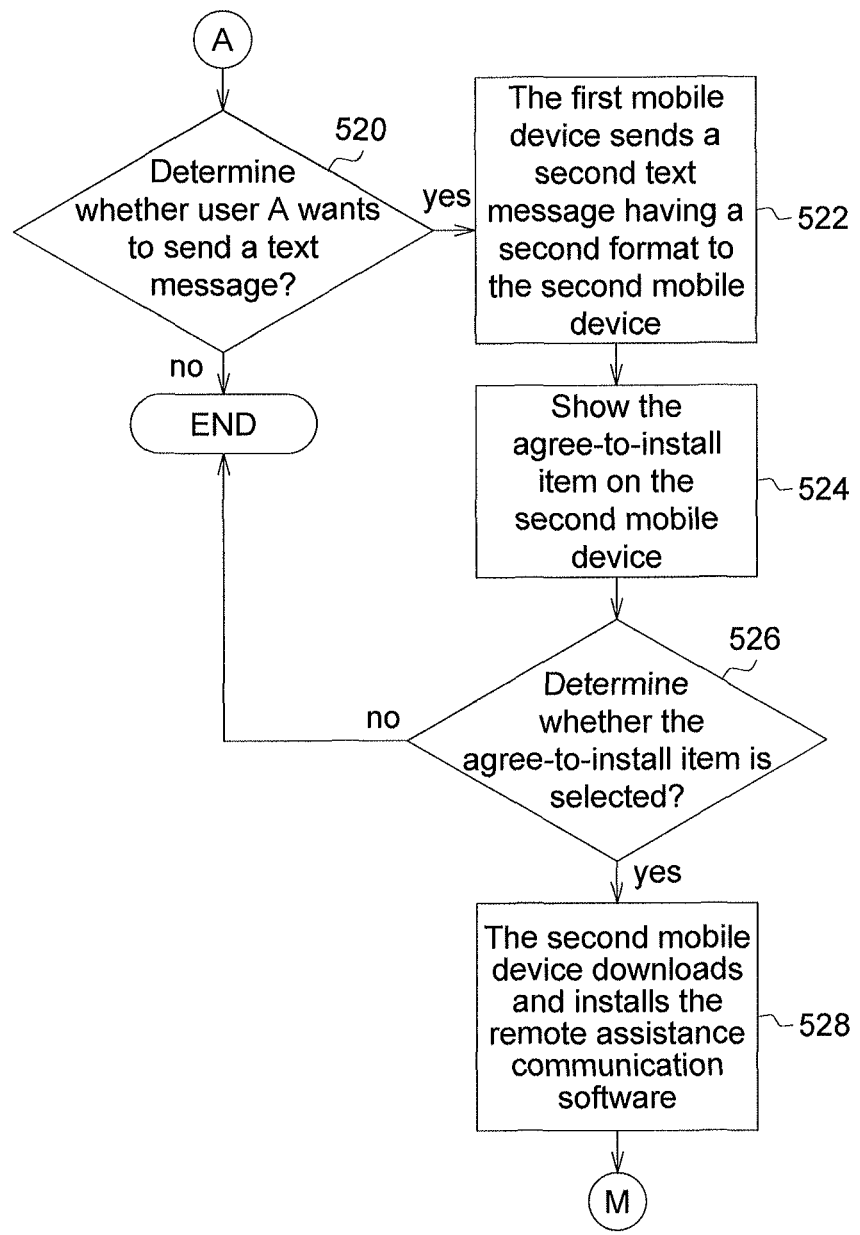
Figure 5C:
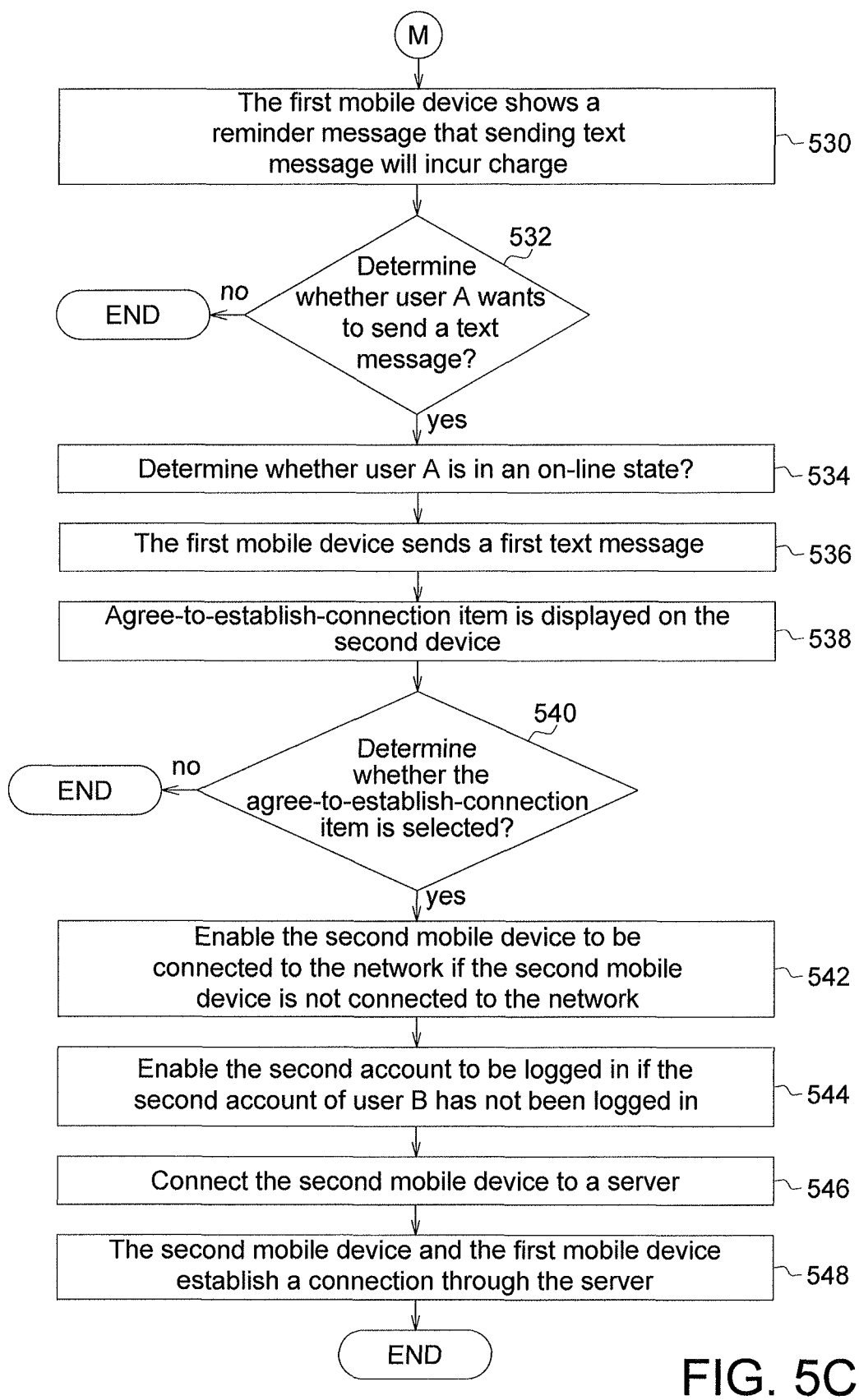

Detailed steps of an embodiment of the disclosure are elaborated below with a flowchart illustrated in FIGS. 5A~5C. Firstly, the method begins at step 502, a call is established by the first mobile device and the second mobile device. Then, the method proceeds to step 504, a connection-assisting item is shown on the first mobile device. Afterwards, the method proceeds to step 506, whether the connection-assisting item is selected is determined. If yes, the method proceeds to step 508; if no, the method proceeds to step 510. In step 507, the first mobile device and the second mobile device is maintained in the state of calling. In step 508, the first mobile device sends a request to query the state of the second mobile device related to the remote assistance communication software. The state of the second mobile device can be obtained by checking the second account of user B of the second mobile device. If the second account is in a login state, it can be determined that user B is currently in an on-line state, and the method proceeds to step 510. If the second mobile device has not installed the remote assistance communication software, it can be determined that user B has not yet registered, and the method proceeds to step 514. If the second mobile device has already installed the remote assistance communication software but is currently not in the login state, it can be determined that user B is currently in an off-line state, and the method proceeds to step 530.

In step 510, whether user A is in the on-line state is determined. If user A is not in the on-line state, the first mobile phone firstly executes the remote assistance communication software, and allows user A to log in by using the first account. Then, the method proceeds to step 512, a connection is established by the first mobile phone and the second the mobile phone through the Internet.

Under the circumstance that the second mobile device has not yet downloaded and installed the remote assistance communication software, user A sends a text message to assist user B with downloading and installing the remote assistance communication software. In step 514, the installation-assisting item is shown on the first mobile device. Then, the method proceeds to step 516, whether the installation-assisting item is selected is determined (that is, the method determines whether the installation-assisting item is pressed by user A or is activated). If the installation-assisting item is selected, the method proceeds to step 518; if no, the method terminates.

In step 518, the first mobile device shows a reminder message that sending text message will incur charge to remind user A. Then, the method proceeds to step 520, whether user A wants to send a text message is determined. If user A wants to send a text message, the method proceeds to step 522; if no, the method terminates.

In step 522, a second text message having a second format is sent to the second mobile device by the first mobile device. After intercepting the second text message having the second format, the second mobile device determines that the intercepted second text message is related to downloading and installing the remote assistance communication software. Then, the method proceeds to step 524, the agree-to-install item is shown on the second mobile device. Afterwards, the method proceeds to step 526, whether the agree-to-install item is selected is determined. If the agree-to-install item is selected, the method proceeds to step 528; if no, the method terminates.

In step 528, the remote assistance communication software is downloaded and installed by the second mobile device according to the installation download link path recorded in the second text message.

Under the circumstance that user B is currently in the off-line state and the second mobile device has installed the remote assistance communication software, the first mobile device will send the first text message. Before the first text message is sent, the method firstly executes step 530. In step 530, a reminder message that sending text message will incur charge is shown on the first mobile device to remind user A. Then, the method proceeds to step 532, whether user A wants to send a text message is determined. If user A wants to send a text message, the method proceeds to step 534; if no, the method terminates.

In step 534, whether user A is in the on-line state is determined. If user A is not in the on-line state, user A logs in the remote assistance communication software and the first mobile device obtains the first account of user A. Then, the method proceeds to step 536, the first text message containing the first account and an identification mark of remote assistance communication software is sent by the first mobile device. Then, the method proceeds step 538, an agree-to-establish-connection item is shown on the second mobile device. Afterwards, the method proceeds to step 540, whether the agree-to-establish-connection item is selected is determined. If the agree-to-establish-connection item is selected, the method proceeds to step 542; if no, the method terminates.

In step 542, whether the second mobile device is connected to the network is determined. If the second mobile device is not connected to the network, the second mobile device is enabled to be connected to the network. Then, the method proceeds to step 544, whether the second account of user B has been successfully logged in is determined. If the second account of user B has not been logged in, the second account is enabled to be logged in. Then, the method proceeds to step 546, the second mobile device is connected to a server, and sends a request of connecting the second account to the first account to the server. In response to the connection request, the server assigns a channel through which the first account and the second account can establish connection, such that the second mobile device and the first mobile device can establish connection through the server as indicated in step 548.

In the above method, in respect of the second mobile device, the remote assistance communication software does not have to be executed all the time (or even does not have to be executed in the background all the time). The remote assistance communication software can be activated only when it needs to be executed. Thus, the accounts of the two mobile phones do not have to be connected all the time, and can be activated only when the second mobile phone receives a text message from the first mobile phone, not only saving a large amount of network source, but also reducing power consumption and memory usage.

According to the embodiment of the disclosure, even when the user of the second mobile device is not familiar with the operation of the mobile phone, the user of the first mobile device can send a first text message for enabling the second mobile device to be connected to the server and establish a connection with the first mobile device. Such design is indeed very convenient to the user of the second mobile device who is not familiar with the operation of mobile phone. Apart from enhancing the convenience of use, the embodiment of the disclosure further makes the design of the smart phone more humanistic, and relieves the user of the fear and inconvenience arising from operating the mobile device.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for establishing connection, comprising:
    establish a call between a first mobile device and a second mobile device;
    showing a connection-assisting item on the first mobile device;
    sending a first text message having a first format to the second mobile device by the first mobile device when the connection-assisting item is selected;
    showing an agree-to-establish-connection item on the second mobile device; and
    connecting the second mobile device to a server and establishing a connection between the first mobile device and the second mobile device through the server when the agree-to-establish-connection item is selected,
    wherein after the agree-to-establish-connection item is selected, the second mobile device executes a remote assistance communication software, and a second account for the remote assistance communication software corresponding to the second mobile device and a first account for the remote assistance communication software corresponding to the first mobile device are used for establishing the connection.

2. The method according to claim 1, wherein the first mobile device and the second mobile device establish the call through a dialer, and the connection is a real-time communication connection.

3. The method according to claim 1, wherein the first text message contains a first account of a remote assistance communication software corresponding to the first mobile device and an identification mark of the remote assistance communication software.

4. The method according to claim 1, wherein after the agree-to-establish-connection item is selected, the second mobile device executes a remote assistance communication software and automatically connects to the network, and a second account for the remote assistance communication software corresponding to the second mobile device and a first account for the remote assistance communication software corresponding to the first mobile device are used for establishing the connection.

5. The method according to claim 1, wherein after the connection-assisting item is shown on the first mobile device but before the first text message is sent by the first mobile device, the method further comprises:
    querying the state of the second mobile device by the first mobile device, and showing an installation-assisting item on the first mobile device when a second account of a remote assistance communication software corresponding to the second mobile device is in an unregistered state;

sending a second text message having a second format to the second mobile device by the first mobile device when the installation-assisting item is selected;

showing an agree-to-install item on the second mobile device; and connecting the second mobile device to a server for obtaining the remote assistance communication software through the server and installing the remote assistance communication software in the second mobile device when the agree-to-install item is selected.

6. The method according to claim 5, wherein the second text message contains an identification information of the remote assistance communication software and an installation download link path of the remote assistance communication software on the network.

7. A mobile device, comprising:
a processing unit;
a display unit coupled to the processing unit; and
a communication module coupled to the processing unit,
wherein after a call is established between the mobile device and another mobile device, a connection-assisting item is shown on the display unit,
wherein when the connection-assisting item is selected, the communication module sends a first text message having a first format to the another mobile device,
wherein when an agree-to-establish-connection item shown on the another mobile device is selected, the another mobile device is connected to a server and establishes a connection with the mobile device through the server, and
wherein after the agree-to-establish-connection item is selected, the another mobile device executes a remote assistance communication software and automatically connects to the network, and a second account for the remote assistance communication software corresponding to the another mobile device and a first account for the remote assistance communication software corresponding to the mobile device are used for establishing the connection.

8. The mobile device according to claim 7, wherein the mobile device and the another mobile device establish the call by using a dialer, and the connection is a real-time communication connection.

9. The mobile device according to claim 7, wherein the first text message contains a first account of a remote assistance communication software corresponding to the mobile device and an identification mark of the remote assistance communication software.

10. The mobile device according to claim 7, wherein after the agree-to-establish-connection item is selected, the another mobile device executes a remote assistance communication software, and a second account for the remote assistance communication software corresponding to the another mobile device and a first account for the remote assistance communication software corresponding to the mobile device are used for establish the connection.

11. The mobile device according to claim 7, wherein after the connection-assisting item is shown on the mobile device but before the first text message is sent by the mobile device, the mobile device further queries the state of the another mobile device, and if a second account of a remote assistance communication software corresponding to the another mobile device is in an unregistered state, an installation-assisting item is shown on the mobile device;

wherein when the installation-assisting item is selected, the mobile device sends a second text message having a second format to the another mobile device;

wherein when an agree-to-install item shown on the another mobile device is selected, the another mobile device is connected to a server through which the remote assistance communication software is obtained and installed in the another mobile device.

12. The mobile device according to claim 11, wherein the second text message contains an identification information of the remote assistance communication software and an installation download link path of the remote assistance communication software on the network.

* * * * *